United States Patent [19]
Higuchi et al.

[11] Patent Number: 5,276,729
[45] Date of Patent: Jan. 4, 1994

[54] RADIOTELEPHONE FOR AUTOMATICALLY DIALING REMOTELY PROGRAMMED NUMBER UPON CALL TERMINATION AND WITHOUT USER OPERATION

[75] Inventors: Masayuki Higuchi, Norcross; Stephen T. Hardin, Snellville, both of Ga.; Tsuyosi Otake, Kodama, Japan

[73] Assignees: Oki Telecom, Suwanee, Ga.; Oki Electric Ind., Ltd., Tokyo, Japan

[21] Appl. No.: 913,738

[22] Filed: Jul. 14, 1992

Related U.S. Application Data

[63] Continuation of Ser. No. 579,894, Sep. 10, 1990.

[51] Int. Cl.⁵ .................................... H04M 11/00
[52] U.S. Cl. ........................... 379/58; 379/63; 379/355; 379/356
[58] Field of Search ............................ 379/57–

[56] References Cited

U.S. PATENT DOCUMENTS

| | | | |
|---|---|---|---|
| 4,734,928 | 3/1988 | Weiner et al. | 379/59 |
| 4,803,717 | 2/1989 | Marui | 379/67 |
| 4,837,800 | 6/1989 | Freeburg et al. | 379/59 |
| 4,860,336 | 8/1989 | D'Avello et al. | 379/63 |
| 4,893,335 | 1/1990 | Fuller et al. | 379/57 |
| 4,958,368 | 9/1990 | Parker | 379/58 |
| 5,046,082 | 9/1991 | Zicker et al. | 379/63 |
| 5,097,502 | 3/1992 | Suzuki et al. | 379/356 |
| 5,109,403 | 4/1992 | Sutphin | 379/59 |

FOREIGN PATENT DOCUMENTS

| | | | |
|---|---|---|---|
| 0176104 | 4/1986 | European Pat. Off. | |
| 0206391 | 12/1986 | European Pat. Off. | |
| 3329267 | 2/1985 | Fed. Rep. of Germany | 379/58 |
| 0077539 | 5/1985 | Japan | 379/58 |
| WO81/02824 | 10/1981 | PCT Int'l Appl. | |
| WO87/01537 | 3/1987 | PCT Int'l Appl. | H04B 7/14 |
| WO88/10039 | 12/1988 | PCT Int'l Appl. | |
| 2170977A | 8/1986 | United Kingdom | H04M 11/06 |

OTHER PUBLICATIONS

Motorola brochure, "Your Portable Connection", America Series Cellular Portable Telephones by Motorola, Jan. 1989.
brochure: "America Series Cellular Mobile Telephones", by Motorola, 1989.
brochure: "Nokia LX11C Car-To-Car/Transferable", Nokia-Mobira, May 1990.

*Primary Examiner*—Curtis Kuntz
*Assistant Examiner*—Dwayne D. Bost
*Attorney, Agent, or Firm*—Jones & Askew

[57] ABSTRACT

A remotely programmable radiotelephone and a remote programming unit. The radiotelephone (10) includes a receiver front end and demodulator (23), receiver signal processing circuits (30), a dual-tone, multiple-frequency converter (31), a controller (50), and a memory (51). The converter (31) converts DTMF tones into digital signals. The controller (50) monitors the output of the converter (31). If the output corresponds to a valid command then the controller (50) executes the command. Certain commands must be preceded by the user entering an access code using a control keypad (56) and by the reception of DTMF tones corresponding to a password or security code stored in the memory (51). Some commands cause telephone numbers to be stored in the memory (51) for later recall by the user. Other commands cause a number to be stored and an outgoing call to be automatically initiated. The remote programming capability allows a user's secretary to cause the radiotelephone (10) to place a call to a party specified by the user, and allows a dealer to reprogram operating parameters and features of the radiotelephone (10) without the user having to come to the dealer's place of business. The remote programming unit provides for the manual or computer-assisted programming of the radiotelephone.

2 Claims, 7 Drawing Sheets

RADIOTELEPHONE FOR AUTOMATICALLY DIALING REMOTELY PROGRAMMED NUMBER UPON CALL TERMINATION AND WITHOUT USER OPERATION

This is a continuation of application Ser. No. 579,894, filed Sep. 10, 1990.

TECHNICAL FIELD

The present invention relates to radiotelephones and, more particularly, to the remote programming and control of radiotelephones by using standard DTMF telephone tones.

BACKGROUND OF THE INVENTION

Portable and mobile radiotelephones, once a rarity, have now become almost commonplace. Many users now find a radiotelephone to be a personal and/or business necessity.

However, the use of a radiotelephone when driving can provide a safety hazard because the user must typically look away from the road, toward the control keypad, in order to dial the desired telephone number. This brief inattention to the driving environment can cause an accident, especially in fast-moving and/or congested traffic. Of course, it is possible to provide speed dial functions so that the user may preprogram commonly called telephone numbers into a memory in the radiotelephone and, when the user desires to place a call, the user simply punches in a smaller set of numbers, typically two or three digits, to cause the radiotelephone to extract the telephone number from the memory and dial the desired telephone number. However, the user is still required to temporarily divert his attention to the control keypad instead of to the driving environment. The diversion time is smaller, because of the reduced number of digits, but can still become significant in many traffic situations. In addition, the user must be able to remember the speed dial bin corresponding to the desired telephone number, must scroll through the speed dial bin numbers displayed on the control display (on systems which provide this feature), or must have a table which indicates the speed dial bin number for a desired telephone number or desired party. However, the latter two conditions still require the user to divert attention from driving conditions and look at the control display or the table. Also, the user must take the time to program the radiotelephone.

Furthermore, depending upon the design of the radiotelephone and the user's manual dexterity, one or both hands may be needed to initiate a call. This can reduce the user's ability to control the car or quickly respond to a changing traffic condition.

Many businessmen/businesswomen have a secretary. The need for the user to divert his/her attention from driving conditions in order to dial a telephone number would be eliminated if the user's secretary could, from a remote location, cause the radiotelephone to dial the desired telephone number. Therefore, there is a need for a radiotelephone which can be remotely controlled so as to cause the radiotelephone to dial desired telephone numbers with little or no action on the part of the user.

Typically, the radiotelephone is programmed by a dealer to allow the use of specified features and use in predefined areas. However, many users travel through one or more radiotelephone service areas in the course of their personal/business affairs and may find that additional areas, a different class of service, different operating privileges, etc., are desired. The process of changing any of these operating parameters is generally an inconvenience to the user because the user must return to the dealer to have the radiotelephone reprogrammed. It would be more convenient for the user if the radiotelephone could be remotely programmed by the dealer. Therefore, there is a need for a radiotelephone which can be remotely programmed by a dealer so as to change the class of service, areas of service, and other operating parameters. However, the radiotelephone should prevent unauthorized persons from changing the operating parameters.

Furthermore, in the case of a non-paying user or a stolen radiotelephone, it is desirable to prevent the further use of the radiotelephone. Therefore, there is a need for a radiotelephone which can be disabled by remote control. However, the radiotelephone should prevent unauthorized persons from disabling the radiotelephone.

Many radiotelephone users travel to different cities. This can make the user difficult to locate unless the user has provided his/her secretary with a table listing the system access telephone numbers for the different cities. Furthermore, if the user is trying to call a party, who has a radiotelephone, in another city then the user must look through the book to determine the system access telephone number for that city. It would be advantageous if the radiotelephone would allow for the system access telephone number for commonly used cities to be programmed into the radiotelephone so that neither the user nor the secretary had to look through the listings book. Therefore, there is a need for a radiotelephone which will store the system access telephone numbers for a plurality of cities.

In addition, there is also a need for a device for remotely programming the radiotelephone. The device must provide for convenient entry of any required passwords, access codes, security codes, instructions, etc., and display responses and instructions from the radiotelephone.

SUMMARY OF THE INVENTION

The present invention provides a radiotelephone which is remotely programmable and controllable using dual-tone, multiple-frequency (DTMF) tones. A DTMF converter is used to convert DTMF tones into digital signals which are acted upon by the controller in the radiotelephone. This allows the radiotelephone to be remotely programmed and controlled. The controller inspects the DTMF tones received for the presence or absence of access and/or security codes and for the instructions that the controller is to execute. One level of access allows the secretary to cause the user's radiotelephone to dial a telephone number or a specified sequence of telephone numbers. Upon instruction by the user, the secretary would look up the telephone number or speed dial bin number for the desired party and key in the command to dial that number using the DTMF keypad on the secretary's telephone, thereby causing the radiotelephone to dial the desired number. This procedure requires minimum action on the part of the user. The user could simply call the secretary using, for example, a known speed dial bin or the user could instruct the secretary to call the user at predetermined times or at predetermined intervals.

This eliminates the need for the user to make any keypad entries in order to implement a telephone conversation. This allows the user to keep his/her eyes on the road and hands on the steering wheel. The user can therefore pay attention to the traffic conditions and quickly respond to changing traffic conditions.

The present invention also allows the dealer to remotely program the radiotelephone. The dealer dials the telephone number corresponding to that radiotelephone or the user dials, or causes to be dialed, the telephone number of the dealer. After the user or dealer answers the call the dealer enters a security code, the user enters an access code, and the dealer then sends DTMF tones corresponding to the desired programming instructions.

The radiotelephone of the present invention includes a radio frequency section, an audio section, a control section, and a user interface section. The RF section and the user interface section are conventional in design. The audio section is conventional in design with the exception of the addition of a DTMF converter for converting DTMF tones to digital signals. In addition, an external adapter provides a voice synthesizer, a message player, and a hybrid and interface which provide for connection to an auxiliary device, such as a modem or a facsimile machine. The voice synthesizer, message player, and hybrid and interface may be internal to the radiotelephone, if so desired. The control section is conventional in design with the exception that the controlling microprocessor inspects the output signals from the DTMF converter to determine if instructions or data are being provided and, if so, whether the instructions or data are valid and authorized. If the instructions or data and authorized then the controlling microprocessor will respond using DTMF tones, store the information in a memory, read information from the memory, execute commands, and/or change the appropriate operating parameters of the radiotelephone.

Therefore, one feature of the subject invention is that the operating parameters of the radiotelephone may be remotely programmed by the dealer.

Another feature of the present invention is that the user's secretary can program one or more telephone numbers into the radiotelephone and cause the radiotelephone to begin dialing the first of these numbers without any action on the part of the user. This feature provides for safety and convenience because the user does not have to divert attention from driving conditions in order to look up and/or dial a desired telephone number. This feature also provides for safety and convenience because the user can continue to use both hands to control the car.

Another feature of the present invention is that a calling party may, using DTMF tones, enter a telephone number or a speed dial bin number, which is stored in memory. Under the control of the user, the stored telephone number is recalled and displayed and, if selected by the user, a call is placed to that stored telephone number.

Another feature of the present invention is that the user's secretary, or another party with whom a call has been established, may, using DTMF tones, enter a telephone number, or the number of a known speed dial bin corresponding to the telephone number, which is then stored in a scratchpad memory in the radiotelephone. Once the current call has been completed the radiotelephone will automatically place a call to that telephone number.

Another feature of the present invention is that certain operating functions, such as "LOCK" and "AUTOMATIC ANSWER MODE OFF", may be remotely initiated.

Another feature of the present invention is that the operating parameters may be changed only by a person who knows the password.

Another feature of the present invention is that the operating parameters may be changed only after the user enters the required access code at the radiotelephone.

Another feature of the present invention is that certain features may be accessed only after the required password has been entered at the radiotelephone or sent to the radiotelephone.

Another feature of the present invention is that the system access telephone number for a plurality of cities can be programmed into the radiotelephone. Therefore, if the user is going to a different city and wishes to leave the system access telephone number for that city with his/her secretary, the user simply scrolls through the ROAM memory bank to find the desired city and obtain the system access telephone number for that city. This feature can also be used to initiate a call to the system of a particular city so that the user can contact another party who also has a radiotelephone and is located in that city.

Another feature of the present invention is a remote programming unit (RPU) which provides for convenience in programming the radiotelephone. The RPU provides the standard sixteen DTMF tones, twelve of which are typically found on conventional telephones. The standard DTMF tones are used to call the radiotelephone and control certain features of the radiotelephone and the other DTMF tones are used to control other features and the operating parameters of the radiotelephone.

DETAILED DESCRIPTION

Figure 1:
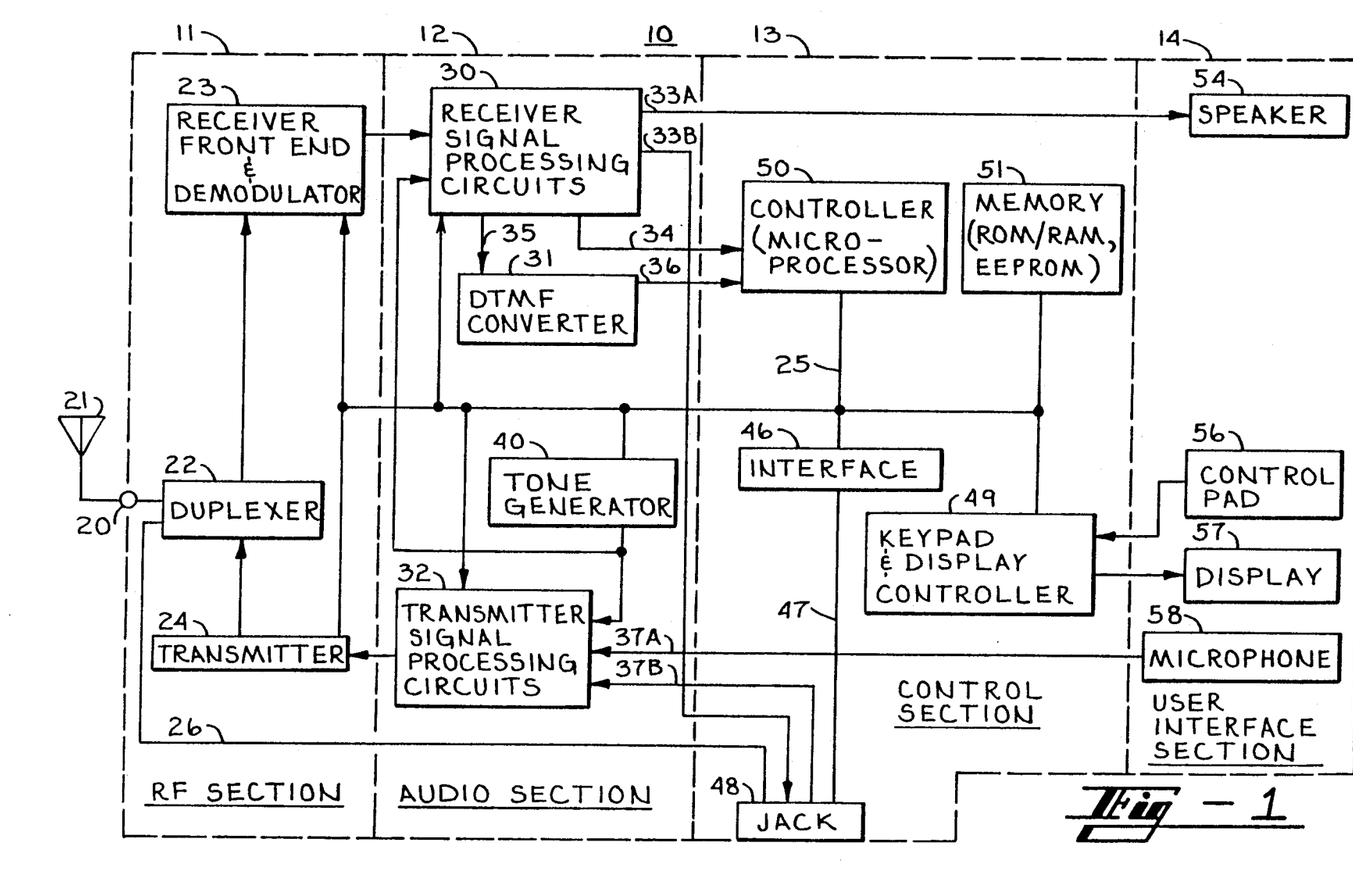
FIG. 1 is a block diagram of a radiotelephone which embodies the present invention.

Turn now to the drawing in which like numerals represent like components throughout the several figures. FIG. 1 is a block diagram of a radiotelephone which embodies the present invention. The radiotelephone 10 has a radio frequency (RF) section 11, an audio section 12, a control section 13, and a user interface section 14. The RF section 11 is conventional in design and includes a connector 20 for connecting radiotelephone 10 to an antenna 21, a duplexer 22, a receiver front end and demodulator 23, and a transmitter 24, all of which are conventional in design. Duplexer 22 couples energy from transmitter 24 to an antenna, such as antenna 21, and couples received signals from an antenna, such as antenna 21, to receiver front end and demodulator 23. Receiver front end and demodulator 23 tunes into the selected RF channel, amplifies the received signal, and demodulates the received signal to recover the information contained in the modulated signal. This information is then provided to the receiver signal processing circuits 30 in audio section 12. The particular channel to which receiver front end and demodulator 23 is tuned is determined by control signals provided by control section 13 over signal path 25. The transmitter signal processing circuits 32 of audio section 12 provides information to transmitter 24. Transmitter 24 contains an oscillator, a modulator, and a power amplifier. The particular RF channel on which transmitter 24 transmits the outgoing signal is controlled by control signals provided by control section 13 over signal path 25. Frequency modulation (FM) is the form of modulation conventionally used for radiotelephones.

Audio section 12 contains receiver signal processing circuits 30, a dual-tone, multiple-frequency (DTMF) converter 31, transmitter signal processing circuits 32, and a tone generator 40, which also generates DTMF tones. Receiver signal processing circuits 30 are conventional in design and provide signal amplification, bandpass or lowpass filtering, recovery of control signals provided by the mobile telephone switching office (MTSO), noise suppression, and muting of the information signal received from receiver front end and demodulator 23. A filtered, selectably muted and selectably gain controlled audio signal is provided by receiver signal processing circuits 30 over signal path 33A to speaker 54 of user interface section 14. Receiver signal processing circuits 30 also provides a filtered audio signal to jack 48 via signal path 33B. This signal is selectably muted and selectably gain controlled if handsfree operation has been selected. Receiver signal processing circuits 30 also provides digital output signals over signal path 34 to controller 50 of control section 13. These digital signals provide supervisory and control signals from the MTSO to the radiotelephone 10 for such functions as: incoming call, call termination, switch to a different channel, increase/decrease power level, etc. Also, receiver signal processing circuits 30 provides an audio signal, not subject to user volume control settings, over signal path 35 to DTMF converter 31. DTMF converter 31 converts DTMF tone signals into digital signals and provides these digital signals to controller 50. Under the control of controller 50, receiver circuits 30 selects a signal from receiver front end 23 or tone generator 40 and provides this selected signal to a selected one of speaker 54 or jack 48.

Transmitter signal processing circuits 32 receives voice signals from microphone 58 of user interface section 14 over signal path 37A, DTMF and other tone signals from tone generator 40, and voice and other analog signals from jack 48 over signal path 37B, and receives control signals from controller 50 over signal path 25. The control signals on signal path 25 may be digital signals intended for the MTSO concerning such functions as: request to place an outgoing call, a telephone number to be dialed, incoming call answered, etc. The digital signals on signal path 25, the tone signals, the analog signals, or the voice signals, as selected by controller 50, are provided by transmitter signal processing circuits 32 to transmitter 24. Transmitter signal processing circuits 32 also performs such functions as bandpass or lowpass filtering for voice, tone, and analog signals and signal waveform shaping for digital signals.

Control section 13 includes a controller 50, a memory 51, an interface 46, a jack 48, and a keypad and display controller 49. In the preferred embodiment, controllers 49 and 50 are embodied as microprocessors. Memory 51 contains a ROM which has the operating instructions for controller 50, a RAM which provides for the temporary storage of information, and an electrically erasable programmable read only memory (EEPROM) which provides for the storage of data which needs to be retained even when operating power is removed from radiotelephone 10. The data may be, for example, authorized operating features or class of service, user-programmed telephone speed dial numbers, security codes, etc. Controller 50 and memory 51 are connected by bus 25. It will be appreciated that controller 50 may contain some or all of memory 51.

Controller 50 inspects digital signals on signal path 34 to determine whether these signals are instructions from the MTSO or are noise. If the signals are instructions then controller 50 responds in accordance with the instruction, such as changing the current channel of operation, signalling the user that an incoming call is occurring, etc. Controller 50 also inspects the signals on signal path 36 from DTMF converter 31 to determine whether the signals are valid signals and, if so, whether any instructions represented by the signals are authorized instructions. If valid, authorized instructions are received in conjunction with any required access code and/or security code controller 50 responds in accordance with these instructions. Controller 50 may perform such functions as storing telephone numbers in memory 51, storing speed dial bin numbers corresponding to desired telephone numbers in memory 51, retrieving telephone numbers from memory 51, initiating placement of an outgoing call, storing new operating information in memory 51, locking, unlocking, turning off the power, etc.

Controller 50 also controls display devices 57 of user interface section 14 by means of digital signals sent via signal path 25 to controller 49. The information displayed may be the channel number, the telephone number, the speed dial bin number, the presence of an incoming call, the status of the current call, the status of the radiotelephone 10, such as locked, unlocked, etc.

Controller 50 also inspects digital signals received from controller 49 which corresponds to key entries made using a user control device, such as control keypad 56 of user interface section 14. These digital signals instruct controller 50 to perform such functions as: entering a new security code, unlocking, locking, causing an incoming call to be answered, placing an outgoing call using a telephone number in memory 51 or a telephone number provided by the user via control keypad 56, etc.

Interface 46 and jack 48 allow for controller 50 to be programmed directly using digital signals, rather than by using DTMF signals. This allows radiotelephone 10 to be programmed both on site and remotely. Interface 46 generally comprises buffers and any other circuits necessary to allow communication between controller 50 and the device plugged into jack 48.

User interface section 14 contains a speaker 54, a control keypad 56, a display device 57, and a microphone 58. Controller 49 is connected to and controls the operation of keypad 56 and display 57. For some radiotelephones, particularly mobile radiotelephones which are installed in an automobile and which cannot also be used as portable radiotelephones, user interface section 14 may be physically separate from the remainder of radiotelephone 10 so that only user interface 14 is present in the passenger compartment of the vehicle.

Figure 2:
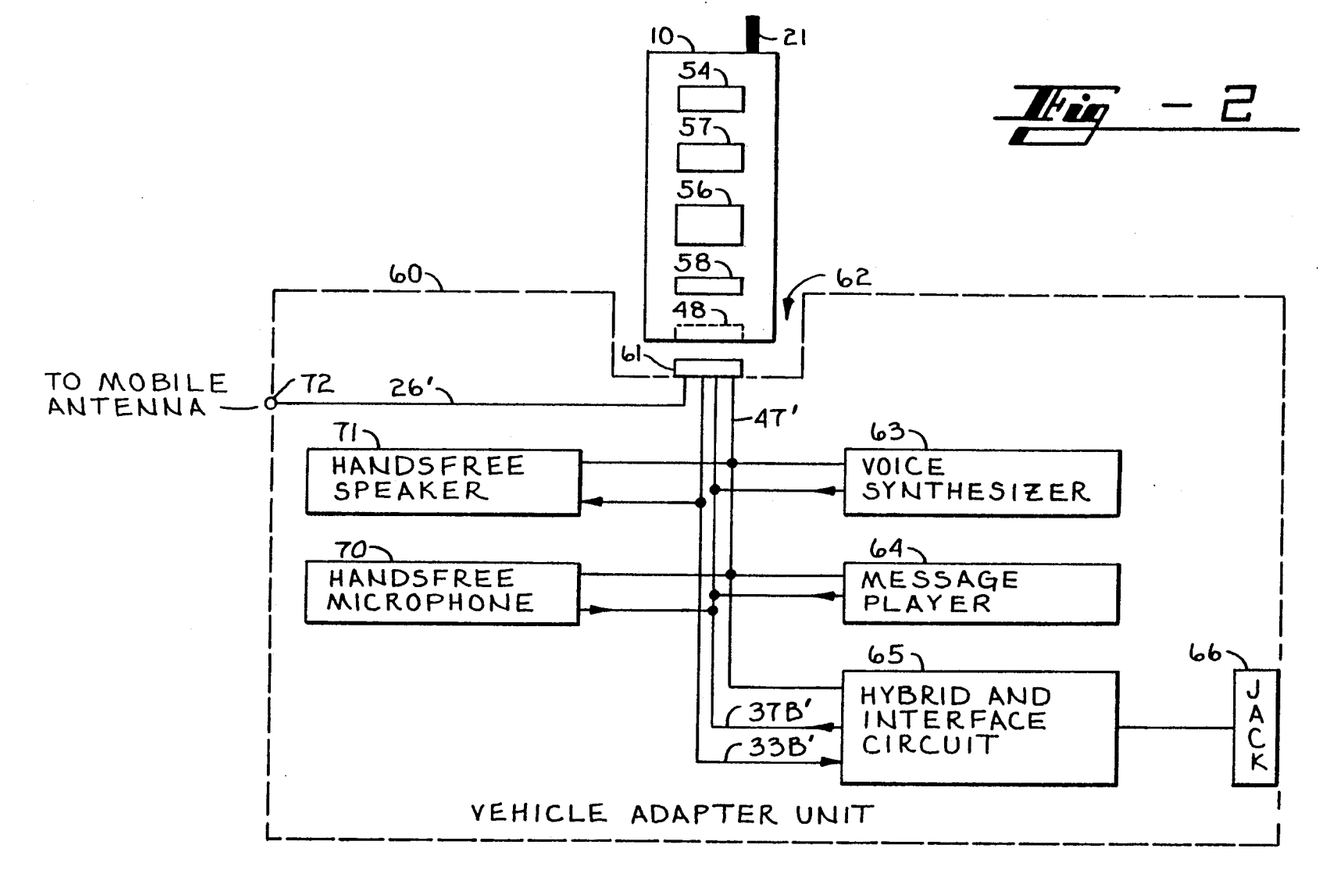
FIG. 2 is a block diagram of a Vehicle Adapter Unit used with the radiotelephone of the present invention.

FIG. 2 is a block diagram of the Vehicle Adapter Unit (VAU) 60 used with the radiotelephone of the present invention. VAU 60 allows radiotelephone 10 to be used as portable radiotelephone (portable mode) when radiotelephone 10 is separate from VAU 60, and as a mobile radiotelephone (mobile mode) when radiotelephone 10 is connected to VAU 60. It will be appreciated that VAU 60 is designed to be installed in a vehicle (not shown). For reasons of cost, weight, size, power consumption, convenience in changing options, and marketing considerations, voice synthesizer 63, message player 64, hybrid and interface circit 65, and jack 66 are placed in VAU 60 instead of in radiotelephone 10. However, if desired, these components may be placed in radiotelephone 10. Also, if desired, DTMF converter 31 may be part of VAU 60. In this case, radiotelephone 10 will only be remotely programmable when it is installed in VAU 60.

VAU 60 has a plug 61, which makes mechanical and electrical contact with jack 48 when radiotelephone 10 is inserted into the cradle 62 of VAU 60. VAU 60 also has a power switch (not shown) and, via plug 61, provides operating power to radiotelephone 10 when radiotelephone 10 is installed in cradle 62. Controller 50 controls the operation of and/or receives status information from voice synthesizer 63, message player 64, hybrid and interface circuit 65, handsfree microphone 70, and handsfree speaker 71, via signal path 47, jack 48, plug 61, and signal path 47'. Message player 64, voice synthesizer 63, hybrid and interface circuit 65, and handsfree microphone 70 send voice and other analog signals to transmitter signal processing circuits 32 via signal path 37B', plug 61, jack 48, and signal path 37B. Similarly, receiver signal processing circuit 30 sends voice and other analog signals to hybrid and interface circuit 65 and handsfree speaker 71 via signal path 33B, jack 48, plug 61 and signal path 33B'. Duplexer 22 is connected by signal paths 26 and 26', jack 48, and plug 61 to connector 72, whereby radiotelephone 10 is switched from antenna 21 to a mobile antenna (not shown) installed on the vehicle in which VAU 60 is installed.

Hybrid and interface circuit 65 and RJ-11 jack 66 provide for the connection of an auxiliary device (not shown), such as an answering machine, a facsimile machine, or a modem, so that the auxiliary device can be used and, in the Data AutoAnswer mode, can answer an incoming call. When in the Data AutoAnswer mode controller 50 will cause hybrid 65 to provide standard ringing signals on jack 66 is response to signals from the MTSO that an incoming call is present. Hybrid 65 will signal controller 50 over bus 25 if the auxiliary device goes off-hook. Controller 50 will then cause hybrid 65 to connect receiver circuits 30 and transmitter circuits 32 to the auxiliary device. The incoming call is thereby connected to the auxiliary device. Hybrid 65 will signal controller 50 when the auxiliary device goes onhook. Controller 50 will then send a disconnect signal to the MTSO and cause hybrid 65 to disconnect the auxiliary device from circuits 30 and 32. Also, if the MTSO sends a disconnect or call termination signal then controller 50 will cause hybrid 65 to disconnect the auxiliary device from circuits 30 and 32. The design and construction of hybrid circuits and interface circuits which perform the functions of hybrid and interface circuits 65, as described above, are well known.

Figure 3:
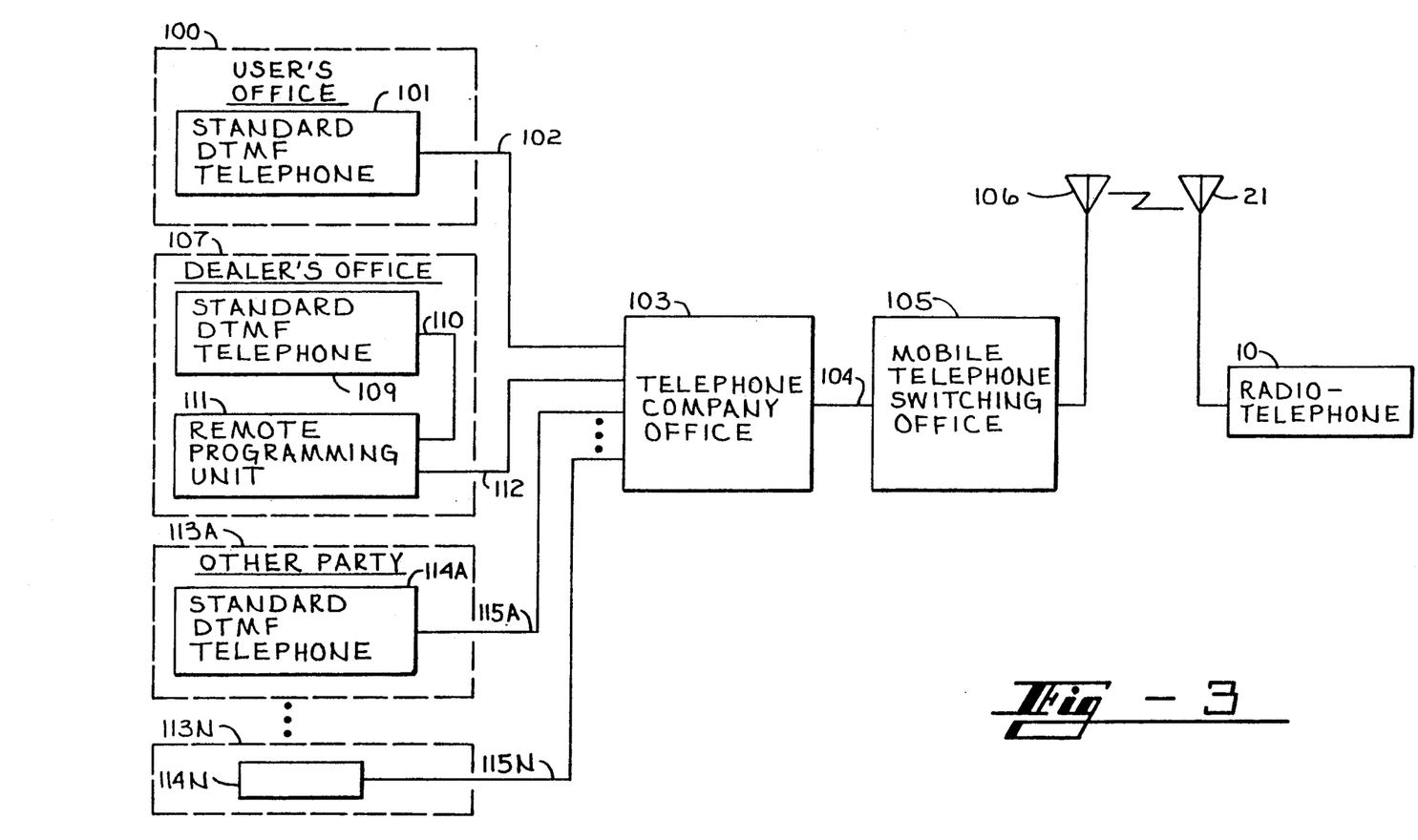
FIG. 3 is a block diagram of the preferred environment of the present invention.

FIG. 3 is a block diagram of the preferred environment of the present invention. The user's office 100 contains a standard DTMF telephone 101 which is connected by telephone link 102, typically a telephone trunk line, to the telephone company office 103. The telephone company office 103 is connected by telephone link 104 to the mobile telephone switching office (MTSO) 105, which includes antenna 106. Radiotelephone 10 includes an antenna, such as antenna 21. To establish contact, the user's secretary may use telephone 101 to call the telephone number assigned to radiotelephone 10. Telephone company office 103 and MTSO 105 then connect telephone 101 and radiotelephone 10. Also, the user may use radiotelephone 10 to place a call to the user's office 100. Once contact has been established the user's secretary will use telephone 101 to key in the telephone number, or the corresponding speed dial bin number, of the party or parties that the user desires to call. Telephone numbers and bin numbers are entered using the format: *+NUMBER+#. In the preferred embodiment radiotelephone 10 has 200 speed dial bins. Therefore, a number between 0 and 199 will be treated as a bin number and any other number will be treated as a telephone number. Radiotelephone 10 will also check the specified bin to verify that a telephone number is located in the specified bin. Radiotelephone 10 will acknowledge the entry of the # key, which signifies the end of the number, by sending a short tone. These numbers are stored in memory 51 in a predetermined memory area, such as a scratchpad memory.

In the preferred embodiment up to 5 telephone numbers and/or bin numbers may be entered. After the fifth number has been entered the old numbers are replaced by new numbers on a first in/first out basis.

As the last number is entered two different modes of operation are possible: manual dialing, and automatic dialing. For the manual dialing mode the user's secretary simply hangs up after entering the last number and the user must cause the radiotelephone 10 to place the call. Each time the user presses the SEND key one of the numbers will be called, on a last in/first out basis. Also, using control keypad 56 and display device 57, the user may scroll through the numbers and place the calls in any desired order. For the automatic dialing mode the user's secretary enters a "0" after the "#" has been entered (*+NUMBER+#+0), hangs up, and radiotelephone 10 will proceed to automatically place the calls. Each time a call is completed, as indicated by the user pressing the END key, radiotelephone 10 will place a call to the next number in the memory. In an alternative embodiment, radiotelephone 10 will also place the next call in response to the MTSO 105 sending an indication that the current call has been terminated.

Radiotelephone 10 has four primary operating modes which are user selectable using control keypad 56. The four operating modes are mutually exclusive and are as follows: AutoAnswer Off; Voice AutoAnswer; Absence AutoAnswer; and Data AutoAnswer. Whenever power is turned off and then back on radiotelephone 10 will automatically, by default, enter the AutoAnswer Off mode, wherein the user must press a key or take some action to answer an incoming call. In the Voice AutoAnswer mode the incoming call indication on display 57 will flash, the incoming call is automatically answered on the programmed ring number, and the answer of the call is announced by a beep through speaker 54 (portable mode) or speaker 71 (mobile mode). Speaker 54 and microphone 58 (portable mode) or speaker 71 and microphone 70 (mobile mode) then are automatically activated. The user may also answer the call by pressing the SEND key before AutoAnswer occurs. This mode of operation requires no action by the user in order to answer an incoming call. It will be appreciated that controller 50 performs the AutoAnswer action in response to a signal from MTSO 105 that there is an incoming call. Controller 50 causes the display 57 to flash and causes tone generator 40 to generate the beep and send the beep to circuits 30 and speaker 54 or 71.

In the Absence AutoAnswer mode, radiotelephone 10 will automatically answer the incoming call on the programmed ring number. If optional message player 64 or voice synthesizer 63 has been installed then controller 50 will cause a message to be played which prompts the calling party to key in his/her telephone number, followed by the # key. If neither voice synthesizer 63 nor message player 64 is installed, or if radiotelephone 10 is in the portable mode, then radiotelephone 10 will send a three-burst tone, signifying that the incoming call has been answered. If optional synthesizer 63 has been installed then, after the telephone number has been entered by the calling party, controller 50 will cause synthesizer 63 to generate spoken words corresponding to the telephone number. The calling party may signify an incorrect telephone number by pressing the * key and re-entering the telephone number. Message player 64 and voice synthesizer 63 may, along with the greeting message, provide instructions regarding correcting an incorrect telephone number. Controller 50 will cause a single-burst tone to be sent to the calling party after the entry of a * or a #. In one embodiment, controller 50 will check the bin number to verify that a telephone number is stored there. If a telephone number is not present controller 50 will cause a three-burst error tone or a message to be sent to the calling party advising that the speed dial bin number is incorrect. If a telephone number is present in that bin controller 50 will cause synthesizer 63 to generate spoken words corresponding to that bin number or corresponding to the telephone number stored in that bin. The calling party may signify an error by pressing the * key and then re-enter the bin or telephone number if the number was incorrect. After the calling party has entered his/her telephone number, or speed dial bin number, controller 50 will cause the number to be stored in a predetermined area of memory 51, such as a scratchpad memory. The calling party may enter the telephone number or speed dial bin number in either of the following formats: NUMBER+#; and *+NUMBER+#. Radiotelephone 10 will display, at display 57, the number of calls answered by radiotelephone 10. The user can return the calls by scrolling through the list of numbers and calling only those numbers of interest in any desired order. The user can view the numbers by pressing RECALL+*+*+*, and using VOLUME UP and VOLUME DOWN. The number can be called by the user pressing "SEND", and can be stored in scratchpad memory by the user pressing "STORE".

In the preferred embodiment, if the calling party entered a valid speed dial bin number controller 50 will cause the telephone number to be displayed. If an invalid bin number was entered then the bin number will be displayed. In an alternative embodiment, only the number actually entered by the calling party is displayed. In the preferred embodiment memory 51 includes the speed dial bins described above, as well as the two scratchpad areas, one of which is used for storing numbers provided by secretarial access, and one of which is used for storing numbers provided during the Absence AutoAnswer mode. These scratchpad areas were arbitrarily selected to store 5 numbers for secretarial access and 9 numbers for the Absence AutoAnswer mode. In the Absence AutoAnswer mode, after the scratchpad area has been filled, radiotelephone 10 will not automatically answer any other calls.

In the Data AutoAnswer mode controller 50 will, in response to an incoming call, cause ringing signals to be sent to speaker 54 and will cause hybrid and interface circuit 65 to send ringing signals to an auxiliary device connected to jack 66. If the auxiliary device goes off-hook controller 50 will notify MTSO 105 that the call has been answered and will then route all audio signals to and from the auxiliary device. Also, as previously described, when the calling party or the auxiliary device goes on-hook controller 50 will disconnect the audio path and, if appropriate, signal MTSO 105 that the call has been terminated.

In both the Absence AutoAnswer mode and the Data AutoAnswer mode, controller 50 will cause the incoming call indicator on display 57 to flash, cause tone generator 40 and receiver circuits 30 to send ringing signals to speaker 54, to signify the user that an incoming call is occurring, and, upon an AutoAnswer, cause a single beep to be sent to speaker 54 to indicate that an AutoAnswer has occurred. The user may, at any time, press the SEND key on keypad 56 and controller 50 will then immediately reroute the audio signals to connect speaker 54 and microphone 58, or handset 55, or speaker 71 and microphone 70, as selected by the user.

In the preferred embodiment, the user may remotely lock and turn off the AutoAnswer mode of radiotelephone 10 provided that radiotelephone 10 is in an AutoAnswer mode or if someone answers the call to radiotelephone 10. The user will, using a DTMF telephone such as telephone 101, call the telephone number for radiotelephone 10 and, upon an answer or an AutoAnswer, enter the desired remote command. The remote LOCK command is *+#+UNLOCK CODE+5, and activates the lock feature. When locked and in an AutoAnswer mode, radiotelephone 10 will allow incoming calls to be answered but will not allow outbound calls to be originated. When locked and in the AutoAnswer Off mode, radiotelephone 10 will not allow incoming calls to be answered or outbound calls to be originated. The remote AutoAnswer off command is *+#+UNLOCK CODE+2, and sets radiotelephone 10 to the AutoAnswer off mode. Radiotelephone 10 acknowledges the commands by sending a short tone after the *, #, the UNLOCK CODE, and the number 5 and the number 2. The UNLOCK CODE is required to be entered in order to prevent an unauthorized person from locking and/or tampering with radiotelephone 10. The UNLOCK code therefore functions as a user access code. In the preferred embodiment, the UNLOCK is a user-programmable code of 1 to 8 digits. If the remote AutoAnswer off command is given when radiotelephone 10 is in the mobile operating mode and either the Message AutoAnswer mode or the Data AutoAnswer mode has been activated then the AutoAnswer feature will be turned off and operating power for radiotelephone 10 will be turned off.

The user may unlock radiotelephone 10 by entering the UNLOCK code using keypad 56.

In the preferred embodiment the dealer's office 107 contains a least a standard DTMF telephone 109 connected by line 110 to a remote programming unit (RPU)

111, which is connected by telephone link 112 to telephone office 103. RPU 111, as described in more detail below, can send and received DTMF tones (0-9,*, #, A-D), and display codes sent to or received from radiotelephone 10. For remote programming the dealer and the user of radiotelephone 10 will establish contact. The dealer can, using either telephone 109 or RPU 111, perform the same functions as the user's secretary. In addition, the dealer can, using RPU 111, perform other functions, as described below. In the preferred embodiment, to allow access to dealer functions, the dealer will send the Service Command (D+#). Radiotelephone 10 will then send its electronic serial number (ESN) to RPU 111. The ESN can be used to determine the authorized operating parameters of radiotelephone 10 and also whether radiotelephone 10 has been reported to be a stolen unit. In response to the Service Command radiotelephone 10 will, via display 57, advise the user to enter the PROGRAMMING ACCESS code using control keypad 56, and then press the STORE key. In the preferred embodiment the PROGRAMMING ACCESS code is a 9-digit code, such as the user's social security number or driver's license number. This code can only be reprogrammed if the proper dealer command is entered. Controller 50 will compare this PROGRAMMING ACCESS code with the PROGRAMMING ACCESS code stored in memory 51. If the user has entered the correct PROGRAMMING ACCESS code then radiotelephone 10 will send an OK (valid) signal (*+D+#) to the RPU 111, which will then advise the dealer to enter the password, which is another type of security code, using the keypad on RPU 111. RPU 111 will send this password to radiotelephone 10. Controller 50 will compare this password with the password stored in memory 51. If the dealer has entered a valid master password or a valid dealer password then radiotelephone 10 will send the OK signal to RPU 111. The dealer may then enter the dealer commands described below.

If the user has entered an incorrect PROGRAMMING ACCESS code then radiotelephone 10 again prompts the user to enter the PROGRAMMING ACCESS code. If an incorrect PROGRAMMING ACCESS code is entered a second time then radiotelephone 10 will send an error (invalid) signal (*+A+#) to RPU 111. RPU 111 will then prompt the dealer to send a dealer LOCK signal (*+#+D+5) to radiotelephone 10. Radiotelephone 10 will then execute the LOCK command and stay locked until the correct UNLOCK code is entered by the user. It should be noted that dealer LOCK code is different than the user LOCK code. The user LOCK code requires that the correct UNLOCK code be known. The dealer LOCK code is useful when an incorrect UNLOCK code has been entered or the UNLOCK code is not known.

If a default password was sent but is inappropriate or if an invalid master password or an invalid dealer password was sent then radiotelephone 10 will send the error signal to RPU 111. The dealer may then enter another password. If a dealer password has not been programmed into radiotelephone 10 then the factory-installed default password will be a valid password. Radiotelephone 10 will then send a PASSWORD signal (*+B+#) to RPU 111, which will indicate to the dealer that a new password must be programmed into radiotelephone 10 before any other functions can be accomplished. The dealer is requested to enter the password twice. If the same new password is entered twice then radiotelephone 10 will send the VALID CODE signal to RPU 111 and store the new password. The dealer may then enter the dealer commands described below. If there is a difference between the first new password and the second new password then radiotelephone 10 will send the INVALID CODE signal to RPU 111. RPU 111 will then advise the dealer to repeat the new password procedure. The password is entered in the format *+PASSWORD+#, where the PASSWORD must be 10 digits.

After each of the following dealer commands radiotelephone 10 will respond with either the OK code or with requested information, in the format *+INFORMATION+#. The number of digits in the INFORMATION field will depend upon the function being performed. The dealer commands are listed in the table, and each command must be proceeded by *+D+A and followed by #.

| Dealer Commands/Functions | |
|---|---|
| Code | Function |
| 1 | Speed Dial Memory Clear. |
| 2 | Reset, to default value, user-programmable functions, such as volume level of ringer, type of ringing tone, display selection, etc. |
| 3+N+Y | Read Number Activation Module(NAM) information where N equals 1-5 for each NAM, and Y equals 1-9 for each parameter. |
| 4+N+X+I | Write NAM information, where N equals 1-5 for each NAM, X equals 1 for a telephone number and X equals 2 for a System Identification Number (SID), and I equals up to 10 digits for a telephone number, and I equals 5 digits for a SID. |
| 5 | Reset dealer password to default password. This function is accessible only if the master password was used for access. |
| 6 | Read Call Restriction Level, such as: no restriction, no incoming calls, no outgoing calls from keypad (outgoing call from speed dial memory only), no long distance calls (local, 800, or 0 + only), etc. |
| 7+Z | Write Call Restriction Level, where Z equals a 4-digit call restriction code. |
| 8 | Read multiple NAM programming. |
| 9+M | Write multiple NAM programming, where M equals 0-5 for the multiple NAM setting, such as: multiple NAM with automatic NAM selection, NAM 1 only, NAM 2 only, etc. |
| 0 | Read A/B System Setting, such as: use System (Carrier) A only, use System B only, use system A if possible, use System B if possible, etc. |
| *+P+S | Write A/B System Setting, where P equals 0-5 for the system setting, and S equals the 5-digit SID. |

The NAM parameters are: a system access telephone number, a system identification number, an initial paging channel, an access overload control, a group identifier, a station class, options, and security codes. In the "NAM X ONLY" mode radiotelephone 10 will only use the system access telephone number specified in NAM X. In the "Automatic NAM Selection" mode radiotelephone 10 may use the system access telephone number in any NAM, subject to the A/B System Setting restriction.

As previously described, other parties may also leave telephone numbers for the user via radiotelephone 10. Other parties 113A-113N each have a standard DTMF telephone 114A-114N respectively, which is connected to telephone office 103 via a telephone link 115A-115N, respectively.

Figure 4:
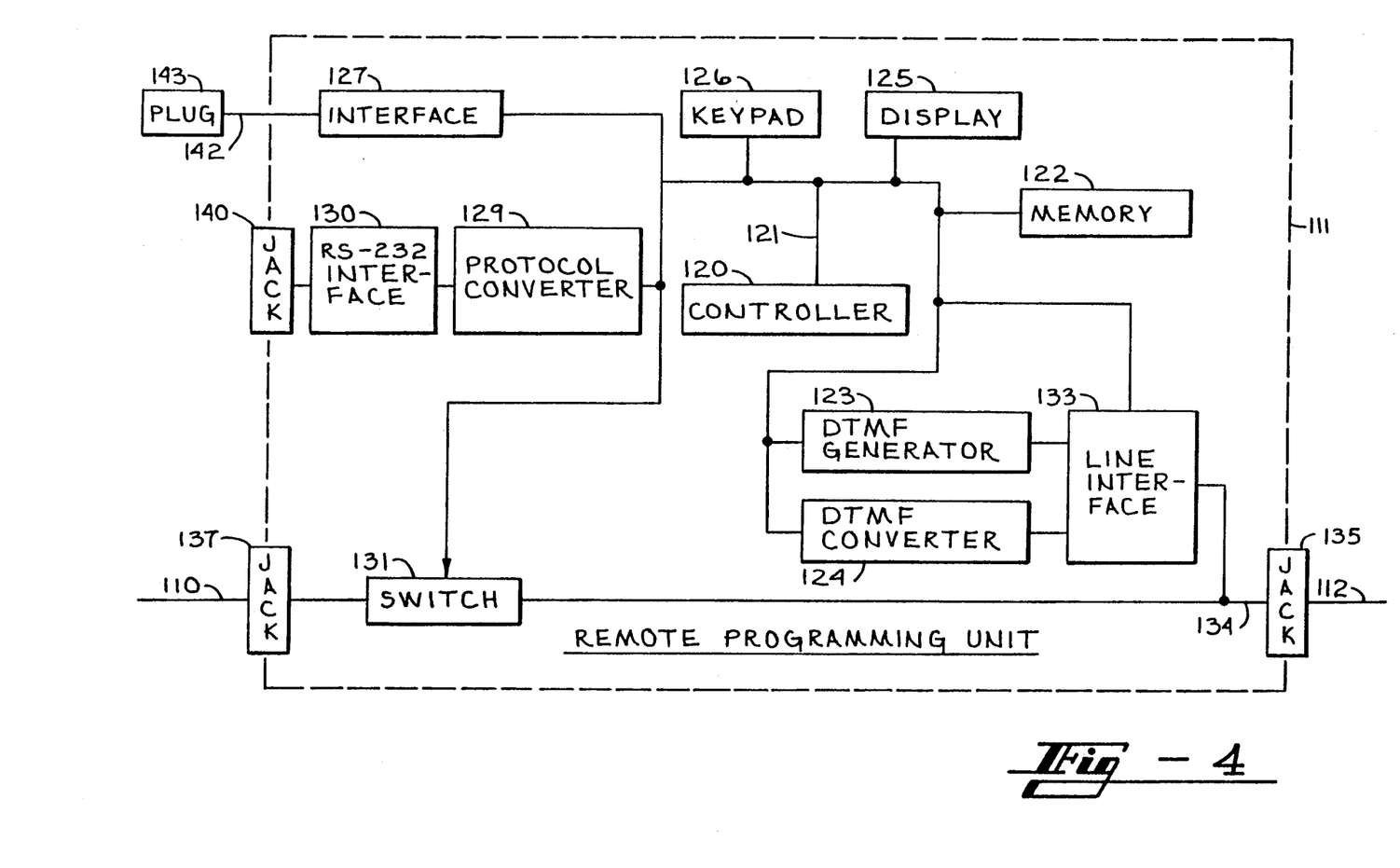
FIG. 4 is a block diagram of the remote programming unit of the present invention.

FIG. 4 is a block diagram of the remote programming unit (RPU) of the present invention. RPU 111 includes a controller 120 connected by signal path 121 to a memory 122, a DTMF generator 123, a DTMF converter 124, a display 125, a keypad 126, an RPU-radiotelephone interface 127, a protocol converter 129, a telephone line switch 131, and a telephone line interface 133. Protocol converter 129 is connected to an RS-232 interface 130. Telephone link 112 is connected to telephone signal bus 134 of RPU 111 through jack 135. Switched telephone line 110 is connected to telephone bus 134 through jack 137 and switch 131. In the preferred embodiment, jacks 135 and 137 are RJ-11 jacks. Telephone jack 137 and bus 134 are selectably connected and disconnected by switch 131, which is controlled by controller 120. Switch 131 allows controller 120 to isolate telephone 109 when RPU 111 is conducting reprogramming of radiotelephone 10, and to connect telephone 109 to telephone link 112 when RPU 111 is not conducting reprogramming. Line interface 133 is connected to telephone signal path 134, is conventional in nature, and performs such functions as seizing the telephone line, electrically isolating the telephone line 112 from RPU 111, voltage surge limiting, sending and receiving signals on telephone line 112, and ring detection. DTMF generator 123 and DTMF converter 124 are selectably connected by line interface 133 to bus 134 under the direction of controller 120. Components 123, 124 and 133 allow controller 120 of RPU 111 to communicate with controller 50 of radiotelephone 10 by using DTMF tones. Display 125 allows controller 120 to prompt the dealer as to the next action to be taken, to display signals being sent to radiotelephone 10, and to display to the dealer the meaning of signals received from radiotelephone 10. Keypad 126 allows the dealer to input commands and data to be provided by controller 120 to radiotelephone 10. Memory 122 contains operating instructions for controller 120 and also stores data received from or to be sent to radiotelephone 10.

Controller 120 is a microprocessor and may, as part of its design, contain some or all of memory 122.

For some functions, such as programming a number of speed dial bins, the use of keypad 126 may be too slow. Therefore, RPU 111 has an RS-232 interface 130 which is connected to an RS-232 connector 140. This allows for the control of RPU 111 and programming of radiotelephone 10 by using a computer or a modem. This is shown in more detail below.

In addition, especially where radiotelephone 10 is a portable unit, it may be desirable to program radiotelephone 10 directly, rather by using DTMF tones. Therefore, RPU 111 also contains an interface 127, a bus 142, and a plug 143. Interface 127 generally comprises buffers and any other circuits necessary to allow communication between RPU 111 and radiotelephone 10. Plug 143 is inserted into jack 48 of radiotelephone 10. This allows for the direct programming of the radiotelephone. In the preferred embodiment, when jack 48 is used for programming radiotelephone 10, it is still necessary to know the security code or passwords in order to accomplish programming.

If an external device, such as a modem or a computer, is plugged into jack 140 and plug 143 is inserted into radiotelephone 10, protocol converter 129 provides any necessary conversion between the protocol used by the external device and the protocol used by radiotelephone 10. In this case, controller 120 does not perform any protocol conversion. However, it will be appreciated that the function of protocol converter 129 may be performed by controller 120 if desired so that converter 129 may be eliminated and interface 130 connected directly to bus 121.

In the preferred embodiment a speed dial bin will have an alpha numeric name field, as well as a telephone number field. It is possible, but cumbersome, to send both alpha characters and numbers by using the limited number of standard DTMF tones. Therefore, in the preferred embodiment, the commands to read the contents of a speed dial bin and to write to a speed dial bin are only valid when radiotelephone 10 is installed in RPU 111. In an alternative embodiment, a speed dial bin number and a telephone number may be programmed using DTMF tones. A speed dial bin may be programmed by the user's secretary using the format: *+*+BIN NUMBER+*+TELEPHONE NUMBER+#. Radiotelephone 10 will acknowledge entries as previously described. In another alternative embodiment, the name field may also be programmed using DTMF tones. This allow the user's secretary to program frequently used telephone numbers into radiotelephone 10. The user's secretary can cause radiotelephone 10 to call the desired number, as described above, or the user may enter the bin number, thereby causing the radiotelephone 10 to retrieve the telephone number at that bin and place a call to that number.

In the preferred embodiment, memory 51 also has thirty ROAM access bins, which are similar to speed dial bins and may, if desired, be part of the speed dial bin function. Each ROAM access bin has an alpha numeric city name field, as well as a field for a system access telephone number for that city. If the user is going to city A and then city B the user will scroll through the ROAM access bins, find city A and city B, and provide the telephone numbers to his/her secretary. The secretary will then be able to quickly establish a call to the user via the system access number for that city. Also, if the user knows that the party to be called is in city C, the user will scroll through the ROAM access bins, find city C, and press "SEND". This will connect the user with the system for city C so that the user can the dial the number of the party to be called.

To program the ROAM access bins the user presses "ALPHA" and "STORE", scrolls (volume up or volume down) to the desired bin, enters the ROAM access number, presses "STORE", enters the city name, and presses "STORE". The user then scrolls to the next desired bin to program the information for the next city. When programming is complete the user presses and holds "CLEAR" to exit the programming mode.

To review the information the user presses "RECALL", presses the "*" key four times, and then presses "RECALL". The user can then scroll (volume up or volume down) through the bins, press "SEND" to call that city, or press "RECALL" to exit the review mode.

In the preferred embodiment, the ROAM access bins are programmed using keypad 56 of radiotelephone 10 or by installing radiotelephone 10 into an RPU 111. It is possible, but cumbersome, to send both alpha characters and numbers by using the limited number of standard DTMF tones. However, in an alternative embodiment, a ROAM access bin number and a telephone number may be programmed using DTMF tones. In another alternative embodiment, the city name may also be programmed using DTMF tones.

Figure 5A:
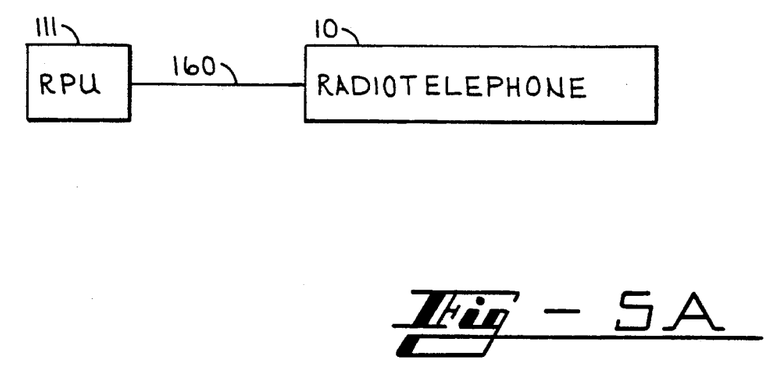
FIGS. 5A to 5E illustrate various programming environments for the radiotelephone.
Figure 5B:
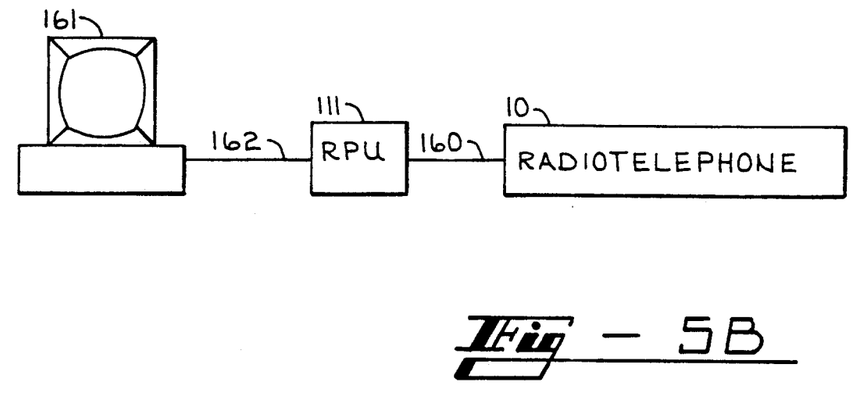
Figure 5C:
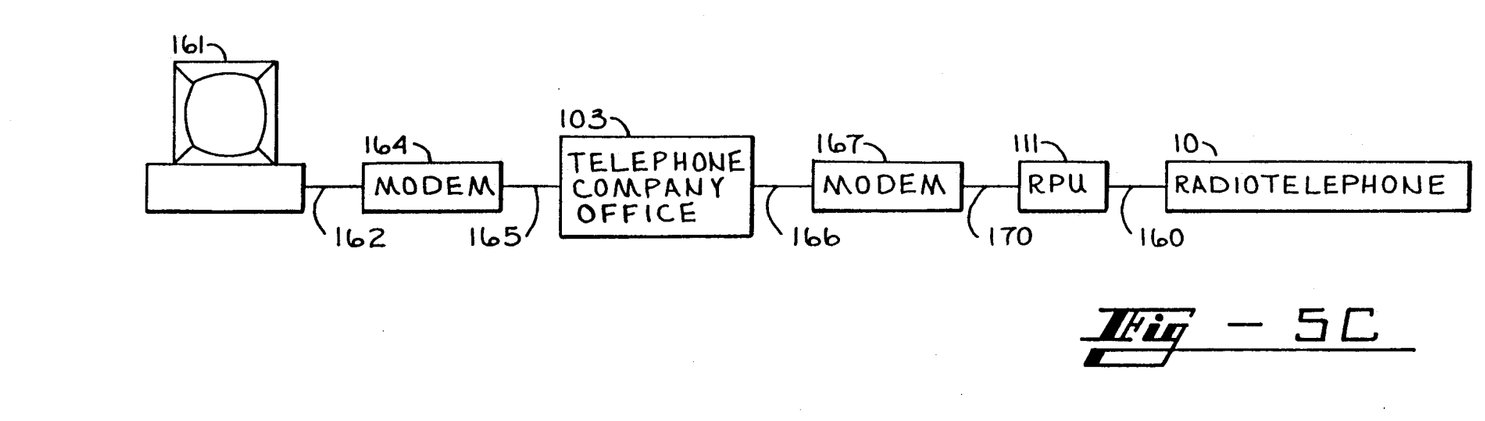
Figure 5D:
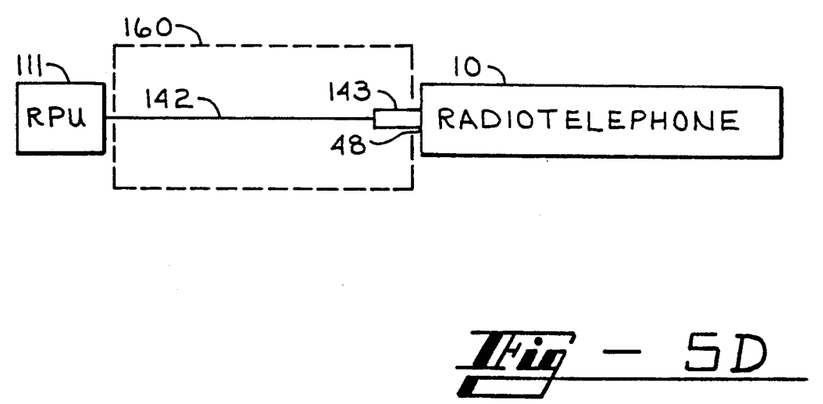
Figure 5E:
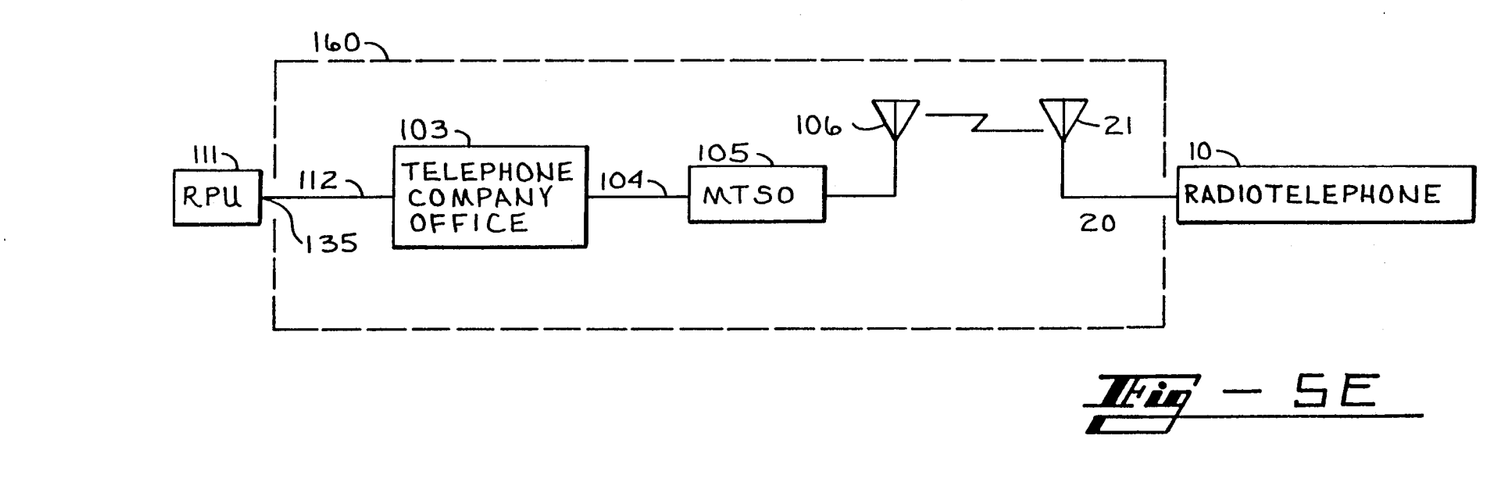

FIGS. 5A 5E illustrate various programming environments for radiotelephone 10. FIG. 5A shows RPU 111 connected by signal path 160 to radiotelephone 10. FIG. 5B shows a personal computer 161 connected by signal path 162 to jack 140 of RPU 111, which is connected by signal path 160 to radiotelephone 10. FIG. 5C shows a personal computer 161 connected by signal path 162 to a modem 164, which is connected by telephone link 165 to telephone company office 103, which is connected by telephone link 166 to modem 167, which is connected by signal path 170 to jack 140 of RPU 111, which is connected by signal path 160 to radiotelephone 10. FIG. 5D shows that, in one application, signal path 160 includes conductor 164 and plug 143, which is plugged into jack 48. FIG. 5E shows that, in another application, signal path 160 includes a telephone link 112 connected between jack 135 of RPU 111 and a telephone company office 103, which is connected by signal path 104 to MTSO 105, which is connected to antenna 106. Antenna 21 is connected to radiotelephone 10. FIG. 5A therefore shows the use of RPU 111 to directly or remotely program radiotelephone 10. FIG. 5B shows the use of a personal computer 161, in conjunction with RPU 111, to directly or remotely program radiotelephone 10. FIG. 5C shows that a personal computer, located remotely from RPU 111, may be used to directly or remotely program radiotelephone 10.

Of course, it will be appreciated that the program for personal computer 161 must understand the meaning of signals from RPU 111, display these signals to the user, accept user entries from a keypad associated with computer 161, and translate these signals into a form recognizable by RPU 111. For example, the computer keyboard entry "S" followed by a carriage return may mean: Read Call Restriction Level. RPU 111 would therefore send to radiotelephone 10 the corresponding remote command, or commands, using DTMF tones or, if radiotelephone 10 is installed in RPU 111, RPU 111 would send the corresponding sequence of serial data signals via plug 143. For reasons of security and/or convenience in use, some commands may only be sent when radiotelephone 10 is installed in RPU 111. In applications where a computer 161 is used RPU 111 functions simply as a protocol converter in FIG. 5D, or as a DTMF generator/receiver in FIG. 5E, between the computer 161 and radiotelephone 10.

Figure 6:
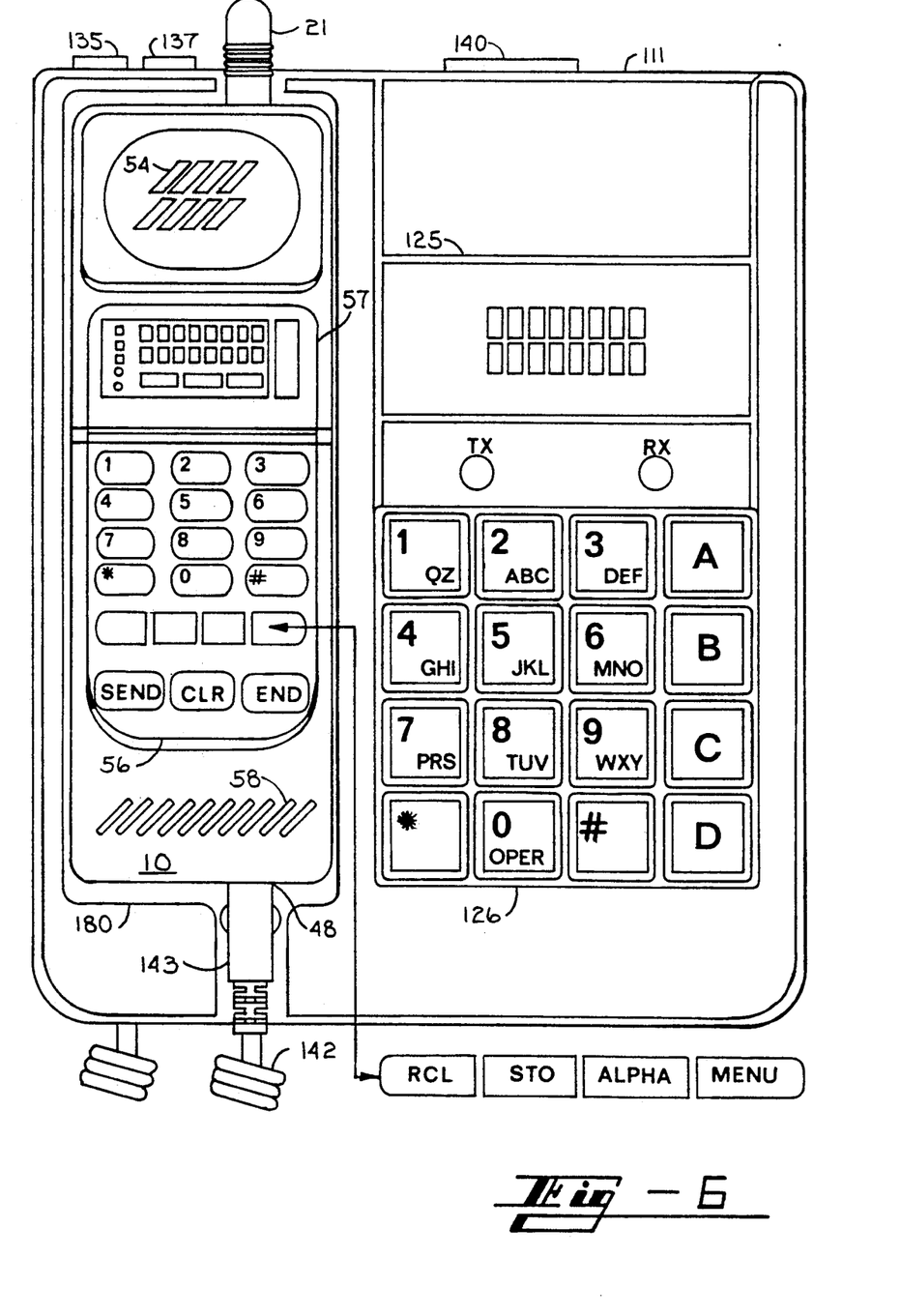
FIG. 6 is an illustration of a portable radiotelephone installed in a remote programming unit.

FIG. 6 is an illustration of a portable radiotelephone 10 installed in a remote programming unit 111. RPU 111 has a control keypad 126, a display 125, a line jack 135, a telephone jack 137, an RS-232 jack 140, a connecting cable 142, and a plug 143. Plug 143 is shown inserted into jack 48 of radiotelephone 10. Also shown are the speaker 54, microphone 58, keypad 56, display 57, and antenna 21 of a portable radiotelephone 10.

It should be noted that keypad 126 of RPU 111 contains keys for the standard DTMF tones as well as the DTMF tones A, B, C and D. The keypad 56 for radiotelephone 10 has standard DTMF keys 0-9, *, and #, as well as keys for the following functions: SEND, CLEAR, END, RECALL, STORE, MENU, and ALPHA. Displays 57 and 125 are eight character, two-line displays. In addition, display 57 has indicator lights for the following conditions: received signal strength, in use, service not currently available, roaming in an "A" system, roaming in a "B" system, AutoAnswer mode on, menu review, and alpha character entry review mode on. Display 125 also contains a TX indicator light and an RX indicator light, which show when RPU 111 is sending data to radiotelephone 10 and receiving data from radiotelephone 10, respectively. RPU 111 has a cradle 180 in which radiotelephone 10 is placed for on site programming.

It will be appreciated from the above that radiotelephone 10 is remotely programmable and operable to receive and store numbers for the user to call as well as for automatically initiating the placement of these numbers. Furthermore, by using the proper access codes and passwords, the status (lock, AutoAnswer Off) and other operating parameters may be remotely programmed and controlled. The use of the access codes or passwords prevents unauthorized persons from interfering with the programming and operation of radiotelephone 10. It will be appreciated from the description above that the user's secretary may send desired telephone numbers and instructions to radiotelephone 10 so that the user is neither required to manually key in the telephone number or even a corresponding speed dial bin number. Radiotelephone 10 also provides for the automatic initiation of dialing of stored telephone numbers and for the manual initiation of the dialing.

It will be appreciated from the above that the present invention is a radiotelephone which can be remotely programmed and controlled using standard DTMF tones and which provides for the use of access codes and passwords so as to prevent unauthorized persons from altering the programming of the radiotelephone. It will be appreciated that the present invention also includes a programming unit for programming the radiotelephone. From the detailed description above and the accompanying drawings variations of the present invention will suggest themselves to those of skill in the art. Therefore, the present invention is to be limited only by the claims below.

We claim:

1. A radiotelephone, comprising:
   transmitter means for providing a modulated transmit signal;
   receiver means for providing a demodulated signal in response to a received signal;
   tone converter means for providing digital signals corresponding to dual-tone, multiple-frequency (DTMF) tones contained in said demodulated signal, said DTMF tones corresponding to a telephone number and an instruction to automatically dial said telephone number, said telephone number and said instruction being provided by a connected party during a first call; and control means comprising a processor and a memory for storing operating instructions for said processor;

wherein said processor responds to a predetermined set of said digital signals when a user is present by storing said telephone number and, upon completion of said first call, by causing said transmitter means to automatically place a second call, without a dialing operation by said user, to said telephone number by sending a said modulated transmit signal corresponding to said telephone number to be called.

2. A method for operating a radiotelephone, said method comprising the steps of:

providing a demodulated signal in response to a received signal;

providing digital signals corresponding to dual-tone, multiple-frequency (DTMF) tones contained in said demodulated signal, said DTMF tones corresponding to a telephone number and an instruction to automatically dial said telephone number, said telephone number and said instruction being provided by a connected party during a first call; and when a user is present, responding to a predetermined set of said digital signals by causing said radiotelephone to store said telephone number and, upon completion of said first call, causing said radiotelephone to automatically place a second call, without a dialing operation by said user, to said telephone number by sending a modulated transmit signal corresponding to said telephone number to be called.

* * * * *